United States Patent [19]
Pizzuti

[11] 4,395,102
[45] Jul. 26, 1983

[54] BELLOWS FOR FOLDING CAMERA

[75] Inventor: Donato F. Pizzuti, Lynnfield, Mass.

[73] Assignee: Polaroid Corporation, Cambridge, Mass.

[21] Appl. No.: 334,982

[22] Filed: Dec. 28, 1981

[51] Int. Cl.³ .................................................. G03B 17/04
[52] U.S. Cl. ................................................................ 354/187
[58] Field of Search .............. 354/187, 192, 193, 194, 354/158

[56]  References Cited
U.S. PATENT DOCUMENTS

| | | |
|---|---|---|
| 3,415,644 | 12/1968 | Land . |
| 3,479,941 | 11/1969 | Erlichman ............................ 354/187 |
| 3,589,253 | 6/1971 | Erlichman ............................ 354/187 |
| 3,594,165 | 7/1971 | Rogers . |
| 3,665,831 | 5/1972 | Harvey ................................. 354/187 |
| 3,683,770 | 8/1972 | Land .................................... 354/187 |
| 3,722,389 | 3/1973 | Costa et al. ......................... 354/187 |
| 3,761,268 | 9/1973 | Land et al. . |
| 3,836,933 | 9/1974 | Hochreiter .......................... 354/187 |
| 3,877,046 | 4/1975 | Sorimachi et al. ................. 354/187 |
| 3,955,207 | 5/1976 | Ort et al. ............................. 354/194 |
| 4,106,039 | 8/1978 | Fukuda ............................... 354/158 |
| 4,166,683 | 9/1979 | Yazaki ................................ 354/192 |

FOREIGN PATENT DOCUMENTS 694711 7/1953 United Kingdom ................ 354/187

*Primary Examiner*—Alan Mathews
*Attorney, Agent, or Firm*—John S. Vale

[57]  ABSTRACT

A folding bellows is provided for use in a folding camera that is movable between erected and storage positions and includes a base section housing having a film plane therein, a pivoting objective lens housing near one end of the film plane, and a pivoting mirror near the opposite end of the film plane for reflecting light from the lens onto the film plane to expose a film unit thereat. The bellows includes a bottom section attached to the base section, a forward wall attached to the lens housing, a rear wall that overlies the erected mirror and has a lower section attached to the mirror and an upper section that is not attached to the mirror, and a extensible top wall. When the camera is erected, the bellows assumes an erected position wherein it forms part of an ambient light excluding exposure chamber for light shielding the camera's exposure optical path. When the camera is folded, the upper section of bellows rear wall pivots back over the lower section and the top wall is extended to overlie the upper section so that the bellows assumes a flat storage configuration.

7 Claims, 7 Drawing Figures

BELLOWS FOR FOLDING CAMERA

CROSS-REFERENCE TO RELATED APPLICATIONS

Certain aspects of the camera disclosed herein are disclosed and claimed in commonly-assigned copending applications U.S. Ser. Nos. 334,979, 334,980, and 334,981 filed on even date herewith.

BACKGROUND OF THE INVENTION

The present invention relates to the field of photography and, more particularly, to an ambient light excluding folding bellows for use in folding cameras of the type including a mirror in the exposure optical path.

Integral self-developing film units of the general type disclosed in commonly-assigned U.S. Pat. Nos. 3,415,644; 3,594,165 and 3,761,268 and marketed by Polaroid Corporation, Cambridge, Mass., under the tradenames SX-70, TimeZero and 600 High Speed Land Film are exposed and viewed through the same side of the film unit thereby requiring an odd number of image reversals in the exposure optical path for correct image orientation.

Most commonly, cameras designed for this type of film include a horizontal base section for supporting a film pack with the forwardmost film unit therein located at the camera's film or exposure plane; an upstanding lens and shutter housing located at the forward end of the base section and supporting the lens with its optical axis generally parallel, or at some other non-peripheral angle, to the film plane; and a mirror mounted at the opposite end of the base section with its forwardly directed reflective surface inclined at an appropriate angle with respect to the film plane and lens axis to reflect image forming light from the lens down onto the film unit for exposure. The mirror thus provides the necessary additional image reversal and also allows the relatively long optical path required for focusing an image on a snapshot sized film unit to be folded thereby making the camera more compact in its exposure configuration.

The present invention is directed to a folding bellows for use in folding cameras of this type which include a housing comprising a plurality of sections that are interconnected for relative movement between an erected exposure position and a folded storage position.

Such folding cameras are well-known in the prior art. For representative examples, see U.S. Pat. Nos. 3,479,941; 3,589,253; 3,683,770; 3,722,389; 3,877,046 and 4,166,683.

Typically, these cameras include a base housing section, a lens and shutter housing pivotally coupled to the forward end of the base section, a long cover section coupled to the trailing end of the base section and a short cover section pivotally coupled to the upper end of the lens and shutter housing and the forward end of the long cover section. So arranged, these four housing sections comprise a four-bar linkage adapted to be moved between a flat folded configuration and an erected exposure position. When erected, the upright lens and shutter housing, short cover and long cover form a longitudinally extending tent-like structure over the base section to locate the lens and mirror in optical relation to one another and a film unit at the exposure position. The open lateral sides of the structure are enclosed by an erected light opaque bellows.

As the camera is folded, the lens and shutter housing pivots forwardly and downwardly in front of the forward end of the base housing section to assume its storage position in substantially coplanar end-to-end relation therewith and the short and long cover sections are aligned in planar end-to-end relation overlying the lens and shutter housing and the base section respectively. The bellows is attached to various housing sections and automatically folds therewith into a longitudinally extended flat shape for storage between the overlying housing sections.

The mirror generally is mounted on the interior surface of the long cover section, within the confines of the bellow, for movement therewith between its erected exposure position and a flat storage position overlying and facing the film plane.

Other cameras of this general type do not employ the four bar linkage folding scheme. For examle, see an alternative embodiment shown in FIG. 8 of the previously-noted U.S. Pat. No. 3,683,770 wherein the camera comprises two pivotally coupled major housing sections which are arranged in overlying relation when the camera is folded and pivot open to a preset angle to erect a bellows that cooperates with the major housing sections to form a generally triangular camera structure. One housing section serves as the receiving chamber for the film pack and the other supports the lens and mirror thereon.

U.S. Pat. No. 3,836,933 discloses a folding self-developing camera for use with film that does not requires an additional reversal for correct image orientation, but does employ two mirrors providing an even number of reversals to fold the exposure optical path in the interest of structural compactness of the erected camera. The mirrors are attached to a foldable frame within a bellows which is also attached to the frame to facilitate folding the bellows.

A common characteristic of all of the above-noted prior art cameras is that the exposure mirror, the portion of the bellows adjacent the mirror, and the mirror support structure have fixed relative positions to facilitate folding or erecting the camera. However, this limits the number of different ways in which the various housing sections may be arranged in the folded position. In other words, the inability to move the mirror, bellows and/or mirror support structure independently of or relative to one another during the folding and erection sequence severely limits the number of possible options for arranging the various housing sections in the folded position.

It is obvious that the folding action of the bellows (its movement between erected and storage positions) must be integrated into the folding scheme of the camera so as not to interfere with the motion of other camera components.

The present invention is directed to a folding bellows that is configured to be compatible with a folding camera that also has a mirror in its exposure optical path but utilizes a different folding scheme than the camera's described above in that the lens housing is pivotally mounted so as to be folded back over the base section in overlying relation to the film plane.

Therefore, it is an object of the present invention to provide a folding bellows that is configured to move between erected and storage positions in a manner that is compatible with the movements of other components of such a camera.

It is another object to provide such a bellows that is simply constructed and folds into a substantially flat storage configuration to minimize the dimensions of the folded camera.

Other objects of the invention will, in part, be obvious and will, in part, appear hereinafter.

SUMMARY OF THE INVENTION

The present invention provides a folding bellows for use in a folding camera of the type including a mirror and its exposure optical path.

The camera includes a base housing section having a film plane therein; a lens housing section mounting an objective lens and being pivotally coupled to the base section, adjacent one end of the film plane, for movement between an upstanding operative erected position and a storage position folded back over the base section so as to overlie at least a portion of the film plane; a mirror assembly including a mirror pivotally coupled to the base section, adjacent an opposite end of the film plane, for coordinated movement with the lens housing section between an erected position for reflecting image forming light rays transmitted by the lens onto the film plane to expose a film unit thereat and a folded storage position overlying at least a portion of the film plane with at least a portion of the mirror located between the film plane and the lens housing section located in its folded position.

The bellows preferably is formed of a thin flexible light opaque material and includes a bottom section, forward wall, rear wall, a pair of side walls and an extensible top wall.

The bottom section is attached to the base section in surrounding relation to the film plane.

The forward wall is joined to a leading end of the bottom section and is attached to a rear wall of the lens housing section. It has an opening therein aligned with the lens through which image forming light rays are transmitted into the interior of the bellows.

The rear wall is joined to the trailing end of the bottom section and is configured to overlie a back side of the mirror when the bellows and mirror are erected. The rear wall includes a lower section thereof that is attached to a facing portion of the mirror, and an upper section thereof that is not attached to that portion of the mirror facing the upper section.

The side walls are disposed on opposite lateral sides of the bellows and they each extend between a corresponding side portion of the bottom section and adjacent ends of the forward and rear walls.

The extensible top wall joins adjacent upper ends of the forward, rear and side walls and is movable between retracted and extended positions.

The bellows is movable, in response to corresponding movement of the lens housing section and mirror assembly, between an erected position wherein the upper and lower sections of the rear wall are in substantially coplanar relation overlying the back side of the erected mirror, the top wall is in its retracted position and the bellows forms at least a portion of an ambient light excluding exposure chamber surrounding the exposure optical path, and a substantially flat folded storage position overlying at least a portion of the film plane wherein the upper section of the rear wall is folded back over its lower section and the top wall is in its extended position.

In a preferred embodiment, the upper section of the rear wall is relatively stiff compared to other flexible portions of the bellows and is configured to pivot back over the lower section in response to the lower section being moved to its storage position by the mirror.

In the illustrated embodiment, the rear wall upper and lower sections and the extended top wall assume a Z-folded configuration located between the mirror and lens housing section when the bellows, mirror assembly and lens housing section are in their respective folded positions.

BRIEF DESCRIPTION OF THE DRAWINGS

For a fuller understanding of the nature and objects of the invention, reference should be had to the following detailed description taken in connection with the accompanying drawings wherein.

DESCRIPTION OF THE PREFERRED EMBODIMENT

Figure 1:
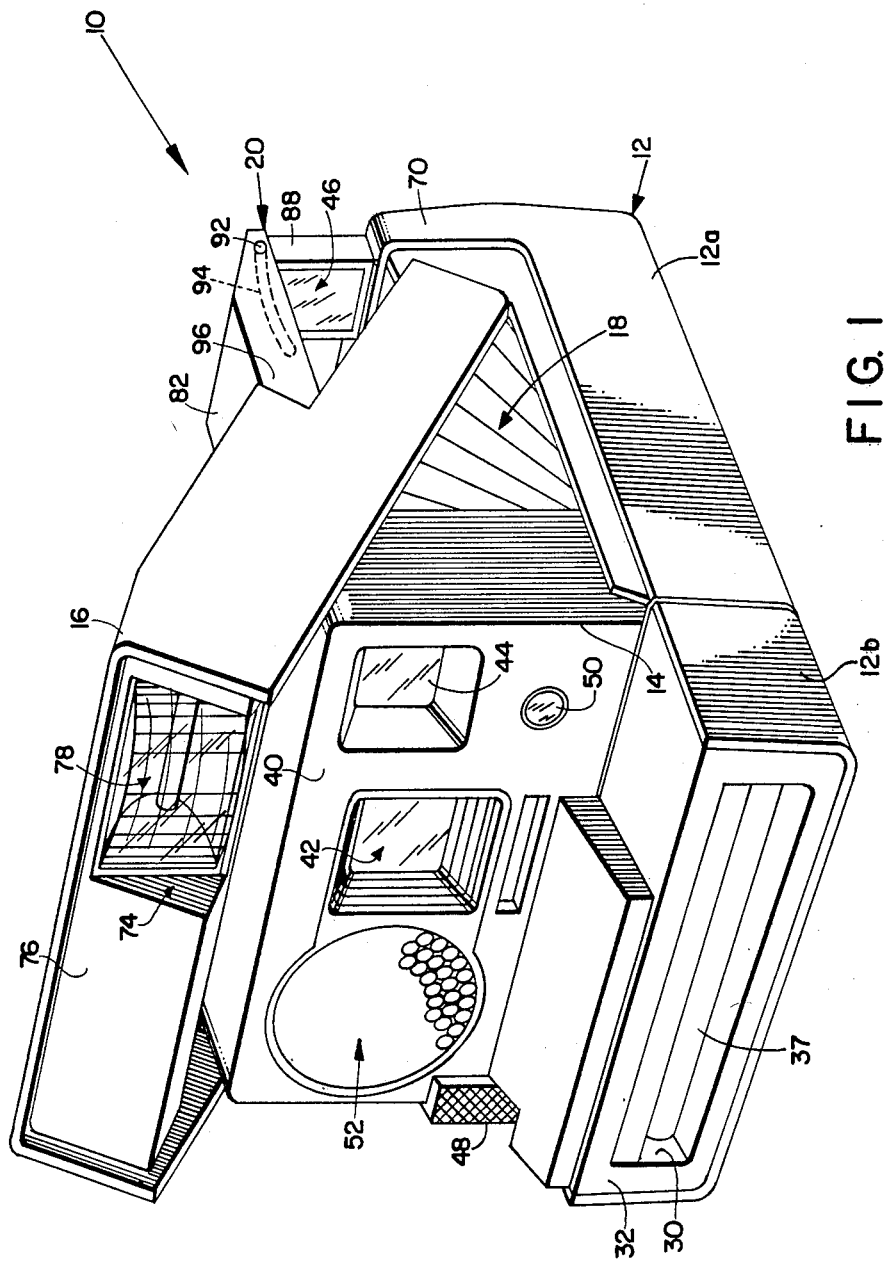
FIG. 1 is a front perspective view of a folding camera, including the folding bellows embodying the present invention, shown in its erected operative configuration.
Figure 2:
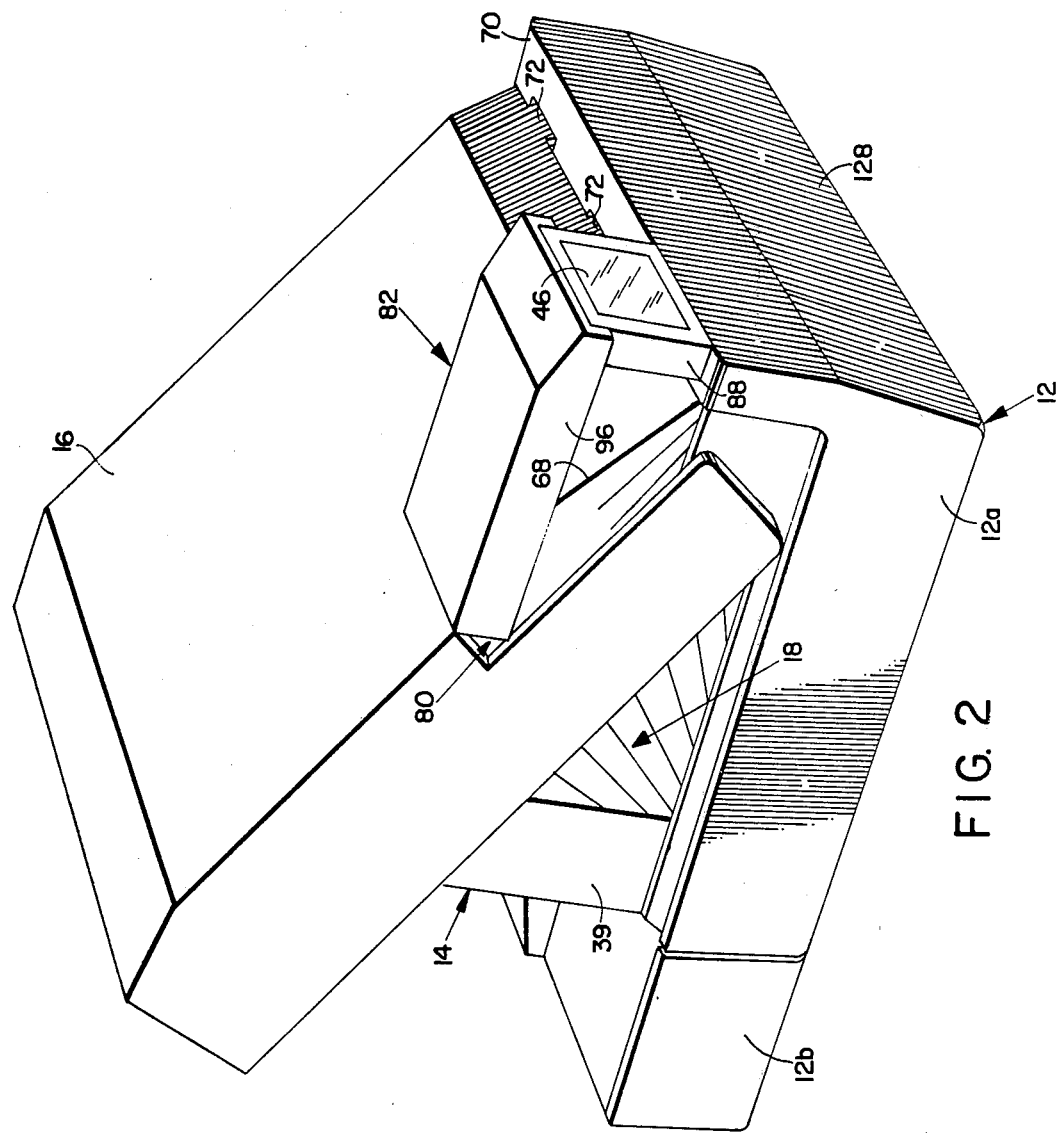
FIG. 2 is a rear perspective view of the erected camera of FIG. 1.
Figure 3:
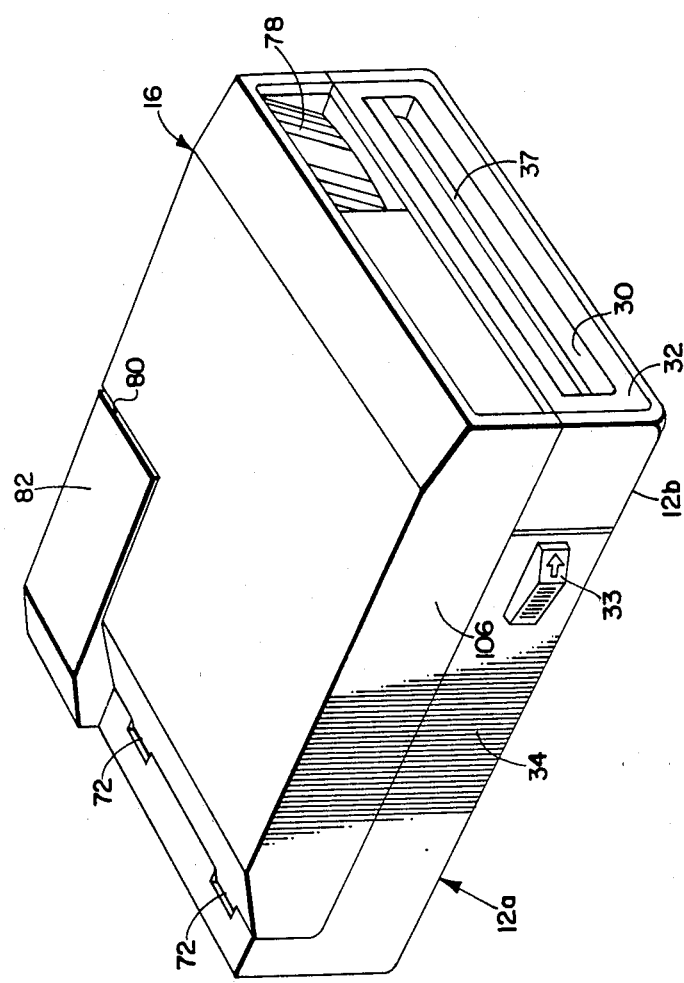
FIG. 3 is a perspective view of the camera shown in its folded storage position.
Figure 4:
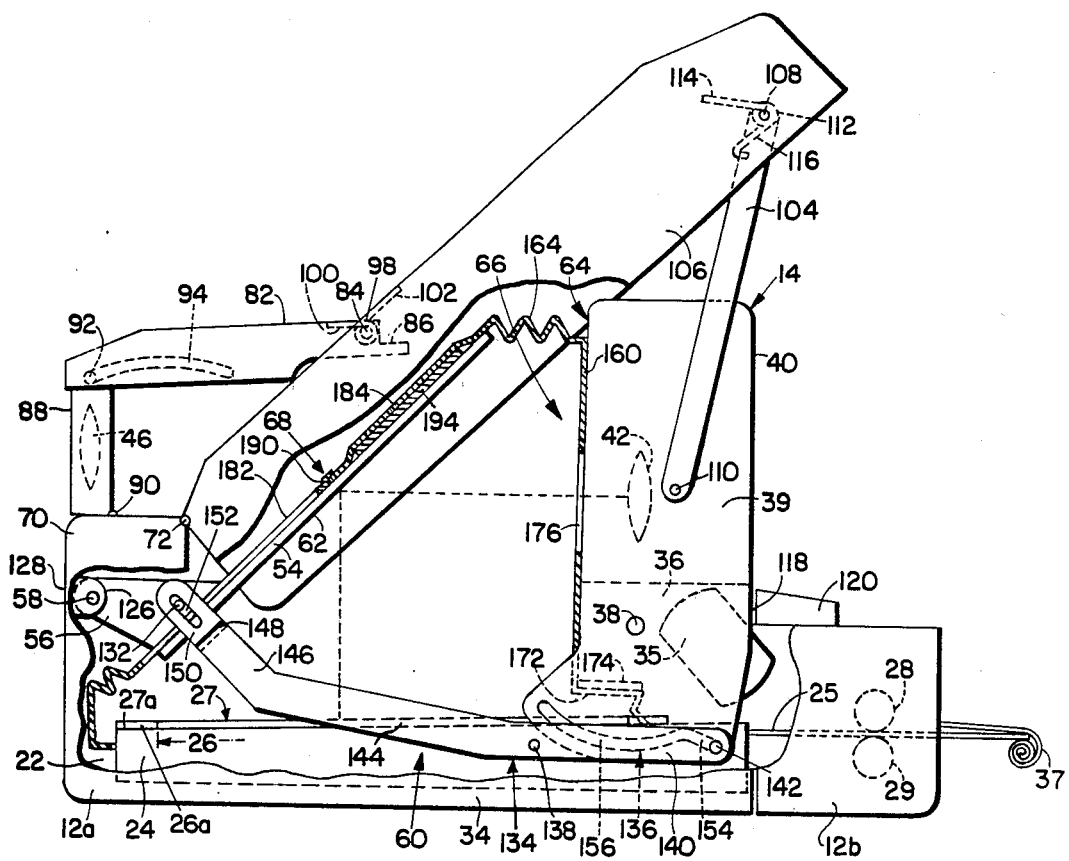
FIG. 4 is a right-side elevational view, partly cut away, to show various components of the erected camera.
Figure 5:
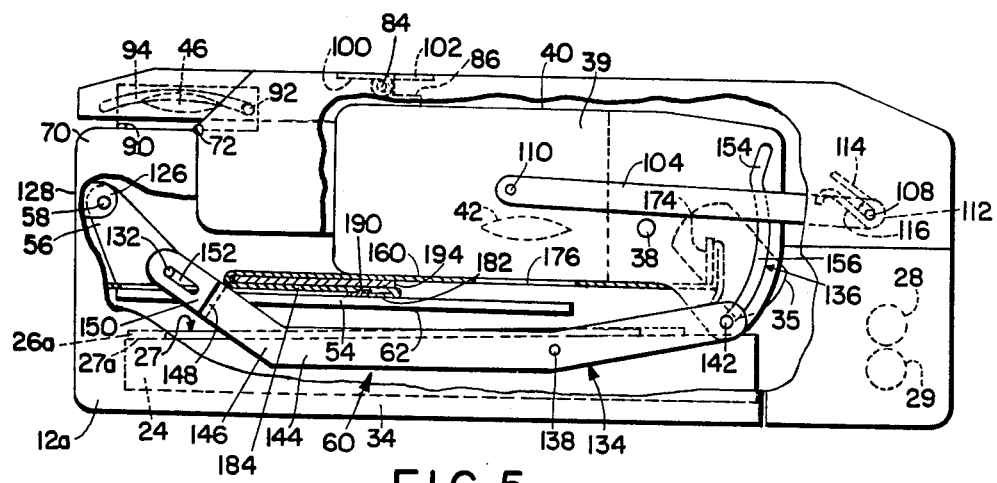
FIG. 5 is a right-side elevational view, partly cut away, showing the components of FIG. 4 in their folded storage positions.

A compact folding camera 10, including a folding bellows 18 embodying the present invention, is shown in its operative erected position in FIGS. 1, 2 and 4, and in its inoperative folded storage position in FIGS. 3 and 5.

The major structural components of camera 10 include a plurality of interconnected housing sections 12, 14 and 16, the folding light opaque bellows 18, and a folding rear viewfinder lens assembly 20.

In the illustrated embodiment, camera 10 is of the self-developing type for exposing and processing integral self-developing snapshot size film units which are exposed and viewed through the front side thereof and therefore require one, or an odd number of, additional image reversals in the exposure optical path for correct image orientation in the final positive print. Representative examples of such self-developing film units are disclosed in commonly-assigned U.S. Pat. Nos. 3,415,664; 3,594,165; and 3,761,268. These film units generally are supplied in a cassette or film container which also includes a flat battery underlying the stack of film units for powering the camera's electrical system. For representative examples of such cassettes, see commonly-assigned U.S. Pat. Nos. 3,779,770 and 3,948,662.

Section 12 is a base housing section comprising a rear portion 12a having means for defining an open-ended chamber 22 therein for receiving and supporting a film cassette 24 so that a forwardmost one of the film units 25 therein (see FIG. 4) is located at the camera's film or exposure plane 26 underlying a rectangular exposure aperture 27 in the top wall 27a of cassette 24; and a forward portion 12b coupled to the leading end of portion 12a for pivotal motion relative thereto between its closed operativeposition (shown) wherein it supports a pair of laterally extending pressure applying rollers 28 and 29 between a film withdrawal slot at the leading end of cassette 24 and a film exit opening 30 in a leading end wall 32 of portion 12b (see FIG. 1); and an inoperative open position (not shown) wherein portion 12b is pivoted downwardly, in a clockwise direction (as viewed in FIG. 4), to provide access to an open leading end of portion 12a through which a film cassette 24 is moved to insert it into or withdraw it from receiving chamber 22. Portion 12b is releasably held in its closed position by a latch mechanism (not shown) which is released by manually actuating a latch release button 33 slidably mounted on the right side wall 34 of portion 12a as shown in FIG. 3.

The means for locating the forwardmost film unit 25 in cassette 24 at the film plane 26 in position for exposure includes a horizontal plate 26a forming the top wall of chamber 22 and having a central aperture therein through which an upstanding rib about the exposure aperture 27 in cassette 24 extends to position the film unit laterally and longitudinally with respect to the film plane 26. The forward wall 27a bears against the underside of plate 26a to locate the forwardmost film unit vertically with respect to the film plane 26. Springs (not shown) on the bottom wall of portion 12a engage the back wall of cassette 24 and urge the cassette upwardly to locate top wall 27a in abutting relation with the underside of plate 26a.

The top roller 28 is adapted to be rotatably driven by a small DC electrical motor 35 mounted on the leading end of an inner frame member (not shown) within portion 12a, and coupled to roller 28 through an elongated gear train (not shown) that extends along the right side of base section 12 outboard of the film receiving chamber 22 and the pressure-applying rollers 28 and 29. A well or recess 36 is provided in the lower portion of housing section 14 for accommodating motor 35.

The major portion of the gear train extends rearwardly into portion 12a from the interface between portions 12a and 12b and has a roller drive pinion (not shown) at its leading end. The drive pinion is drivingly engaged with a larger gear (not shown) fixed to the right end of roller 28 when portion 12b is located in its closed operative position to impart rotary motion to roller 28. This larger gear becomes disengaged from the drive pinion and pivots downwardly with portion 12b when it is opened for loading a cassette 24 into chamber 22.

At the trailing end of the gear train is a film advancing mechanism or pick (not shown) that extends into a slot at the trailing right-hand end of the cassette 24 and engages the rear edge of the forwardmost film unit 25. The pick is advanced forwardly by a pick drive cam or pin on one of the gears in the train when it rotates in response to being driven by motor 35. The forward motion of the pick advances the forwardmost film unit 25 through the film withdrawal slot in the leading end of cassette 24 and feeds the leading end of the film unit 25 into the bite of the pressure-applying rollers 28 and 29.

Following exposure of the forwardmost film unit 25 through aperture 27, the motor 34 is energized, preferably by the flat battery in cassette 24, and the exposed film unit is advanced by the pick into engagement with the rollers 28 and 29. Roller 28 is rotated in a counterclockwise direction to advance the film unit 25 between the pressure-applying rollers and along a film exit path extending through the film exit opening 30 to the exterior of the camera 10.

The rollers 28 and 29 apply a conpressive pressure to the film unit 25 as it is advanced therebetween for rupturing a pod at the leading end of the film unit and releasing therefrom an opaque fluid processing composition which is distributed between predetermined layers of the film unit to initiate a well-known development and diffusion transfer process. In the illustrated embodiment, as film unit 25 is advanced through the exit opening 30, it engages and uncoils a light opaque retractable frog's tongue 37 that protectively covers the emerging film unit to block the passage of ambient light rearwardly along transparent layers of the film unit thereby protecting the photosensitive portion of the film unit behind the rollers, which has not yet been covered with the processing fluid, from being fogged.

The components and systems in base housing section 12 for supporting a film unit 25, supplied in cassette 24, at the camera's film plane 26 in position for exposure, and for processing and ejecting the film unit from the camera following exposure are all well-known in the prior art and need not be described further here to understand the present invention. Representative examples of such components and systems suitable for use in camera 10 are disclosed in commonly-assigned U.S. Pat. Nos. 3,714,879; 3,967,304; 4,047,192; and 4,051,492, all of which are incorporated by reference herein.

The lens and shutter housing 14 is pivotally coupled to the inner frame within base housing section portion 12a adjacent the leading end of the film plane 26, at pivot pins 38 on the opposite lateral side walls 39 of housing section 14, for movement between the erected exposure position of FIGS. 1, 2 and 4 wherein it stands upright with respect to base housing section 12 and the flat or folded storage position of FIGS. 3 and 5 wherein housing section 14 is folded back over housing section 12 so as to overlie at least a portion of the film plane 26.

As best shown in FIG. 1, housing section 14 mounts, on a forward wall 40 thereof, an adjustable focus objective or taking les 42; a front veiwfinder lens 44 which is configured to be located in optical alignment with a rear lens 46 on viewfinder lens assembly 20 when camera 10 is erected to define a Gallilean-type viewfinder for framing the scene to be photographed; a camera cycle start botton 48 that is manually actuable to initiate an automatic film exposure and processing cycle; a window 50 for transmitting scene light to a photocell within housing 14 forming part of the camera's automatic exposure control system; and an optional sonar transducer 52 forming part of an optional automatic ranging and lens focusing system.

Located behind lens 42 is an electronically controlled shutter (not shown) for automatically regulating the transmission of image forming light rays through lens 42 to the film plane.

Figure 6:
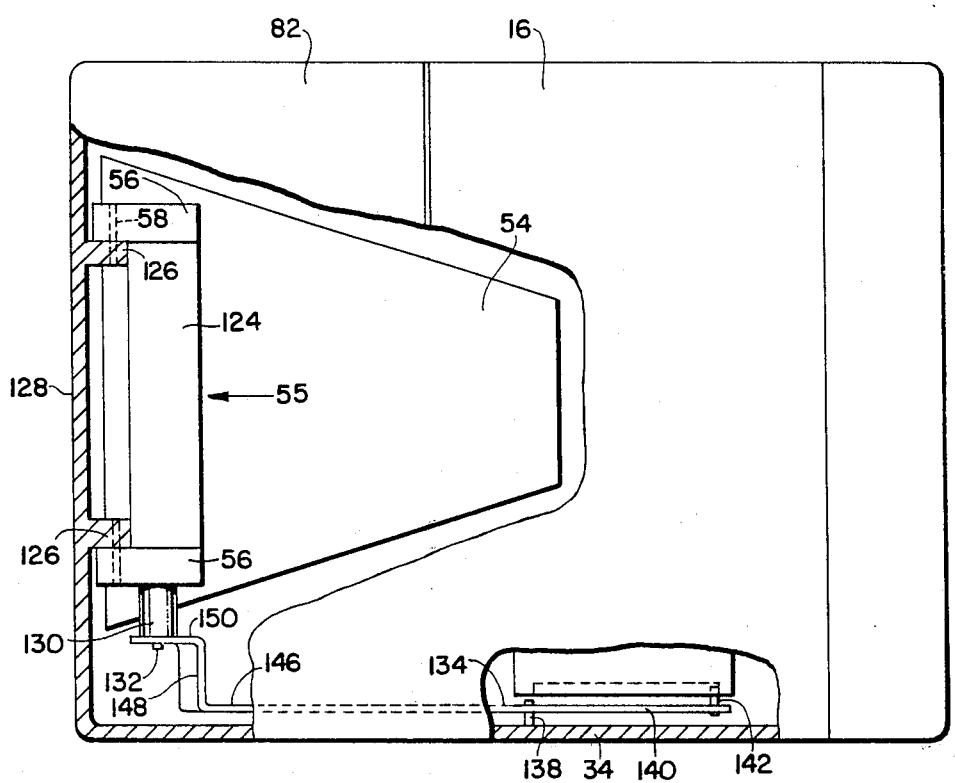
FIG. 6 is a plan view, partly cut away, of the camera.

As best shown in FIGS. 4, 5 and 6, base housing section portion 12a also mounts a trapezoidal-shaped mirror 54 therein for reflecting image forming light rays from lens 42 onto a film unit 25 located at the exposure position. Mirror 54 is attached near its trailing or bottom end to a mirror support frame 55 having a pair of laterally spaced rearwardly extending arms 56 thereon that are pivotally coupled at pivot pins 58 in base housing section portion 12a adjacent the opposite or trailing end of the film plate 26 for movement between the erected inclined exposure position of FIG. 4 and the flat storage position of FIGS. 5 and 6. This mirror assembly is interconnected with lens and shutter housing section 14 by a linkage system 60, to be described later in detail, for mutual coordinated movement between their respective erected and folded positions.

When camera 10 is erected, the mirror 54 assumes an inclined exposure position over the film plane 26 with its front reflective surface 62 set at a predetermined angle with respect to the optic axis of lens 42 and a film plane 26 so that the reflected image forming light impinges the film plane at an angle that is normal thereto. In the illustrated embodiment, the erected housing section 14 is substantially perpendicular to the base section 12 so that the optic axis of lens 42 is parallel to the film plane 26, and the front surface 62 of the erected mirror 54 is set at an angle of 45° with respect to the optic axis and the film plane 26.

The mirror 54 serves two distinct purposes. First, it provides an additional image reversal in the exposure optical path so that the positive image in the final print has the correct orientation. It also serves to fold the optical path between lens 42 and the film plane 26 to make the erected camera more compact.

As will become apparent later, the mirror assembly is pivoted toward its folded position ahead of housing section 14 so that the folded mirror 54 overlies at least a portion of the film plane 26 and is located between the film plane 26 and a rear wall 64 of housing section 14 located in its folded position.

Figure 7:
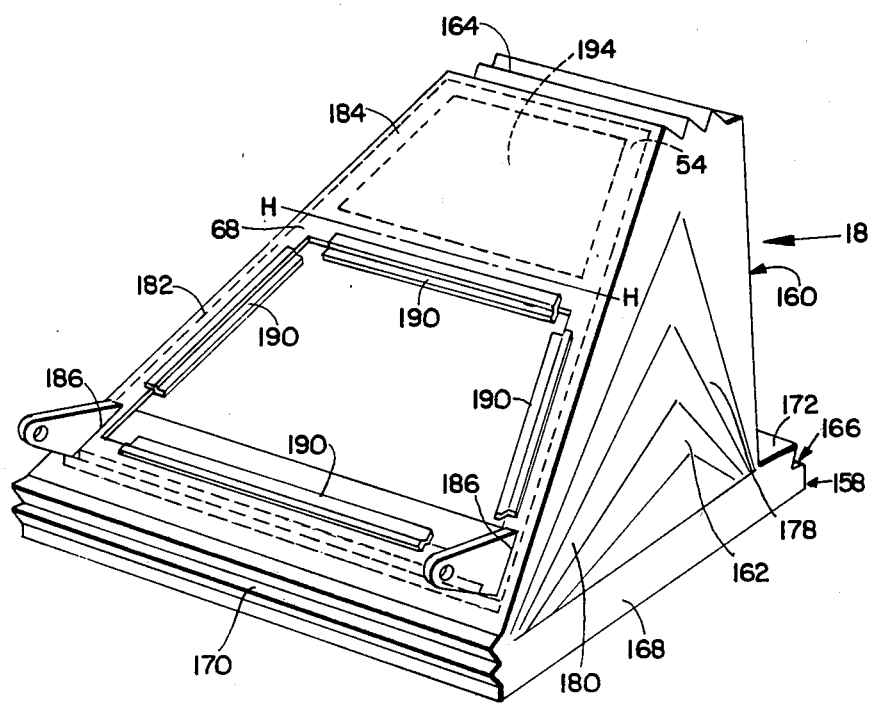
FIG. 7 is a perspective view of the folding bellows, embodying the present invention, shown in its erected position.

Coupled between the rear wall 64 of lens and shutter housing 14 and a perpheral section of the inner frame within base section portion 12a adjacent the film plane area is the flexible light opaque bellows 18 that is movable between the erected position of FIGS. 4 and 7 wherein it cooperates with base section portion 12a and housing section 14 to define a light excluding exposure chamber 66 surrounding the optical path from lens 42 to the film plane 26, and a folded storage position shown in FIG. 5 wherein bellows 18 is folded back on itself along a rear wall 68 thereof so that a portion of the folded bellows assumes a flat configuration located between the rear wall 64 of the folded housing section 14 and the backside of the folded mirror 54. As will become apparent later, when bellows 18 and linkage system 60 are described in more detail, camera 10 is constructed so that mirror 54 essentially is pivoted downwardly ahead of an upper portion of the bellows to clear a bellows folding path and permit the compact folded arrangement of the various components shown in FIG. 5.

Housing section 16 is a clam shell cover section pivotally coupled at its trailing end to a trailing and upstanding section 70 of base section portion 12a at hinge structure 72 for movement between the operative erected position of FIGS. 1, 2 and 4 and the inoperative folded storage position of FIGS. 3 and 5.

Mounted in a receiving well 74 formed in a leading end wall 76 of cover section 16 is a small compact electronic strobe lighting unit 78, best shown in FIG. 1, serving as a source of artificial illumination for flash photography when cover section 16 is at its erected position to position unit 78 above lens 42 so that its light output is directed toward the scene to be photographed.

In the illustrated embodiment, strobe unit 78 is integrated into an automatic exposure control system and preferably is of the variable output type which is automatically fired and quenched at appropriate times during the course of an exposure cycle to provide primary scene lighting or auxiliary light for fill flash exposures. The flash parameters for any given exposure are automatically selected in accordance with various preexposure inputs including ambient scene brightness level and camera-to-scene distance. Representative examples of automatic exposure control systems suitable for use in camera 10 may be found in commonly-assigned U.S. Pat. Nos. 4,074,288; and 4,188,103, and copending application U.S. Ser. Nos. 262,501 filed on May 11, 1981 and 275,718 filed on June 22, 1981, now U.S. Pat. No. 4,354,748, all of which are incorporated by reference herein.

A longitudinally extending aperture or opening 80 is provided in the left rear corner portion of cover section 16 for accommodating the rear viewfinder less assembly 20. Assembly 20 comprises an elongated cap or cover 82 that is pivotally coupled at its opposite lateral sides to section 16 at pivot pins 84, adjacent the leading end of opening 80 and includes a forwardly extending finger 86 at the leading end thereof that extends into the interior of section 16 beyond the pivot pins 84; and the rear viewfinder lens element 46 fixed in a rectangular frame 88 having its bottom forward edge pivotally coupled to upstanding section 70 on base portion 12a at hinge 90 and a pair of outwardly extending guide pins 92 fixed at the upper sides of frame 88 and having their outboard ends captured in a pair of arcuate longitudinally extending guide and camming channels 94 formed on the interior of lateral side walls 96 of cover 82. A torsion spring 98 is wound about one of the cover pivot pins 84 and has one arm 100 thereof secured to cover 82 and the other arm 102 thereof secured to cover section 16 to provide a biasing force on cover 82 that urges it to rotate in a clockwise direction about pins 84.

As will become apparent later, assembly 20 is automatically erected to its operative viewing position shown in FIGS. 1, 2 and 4 in response to the manual movement of cover section 16 from its folded or closed position to its erected or open position and, likewise, is folded automatically to assume its storage position shown in FIGS. 3 and 5 when cover section 16 is closed.

Cover section 16 is connected near its forward right-hand end to the lens and shutter housing section 14 by means of an elongated erecting link 104. The upper or forward end of link 104 is pivotally coupled to the interior of cover section side wall 106 at pivot pin 108 thereon, and the lower end of link 104 is pivotally coupled to the right side wall 39 of housing section 14 at pivot pin 110, above and slightly forwardly of the lens and shutter housing pivot 38. A torsion spring 112 wrapped about pin 108 has one arm 114 thereof attached to side wall 106 and the other arm 116 thereof engaged with link 104 to provide a biasing force on link 104 that urges it to pivot in a counterclockwise direction (as viewed in FIGS. 4 and 5) about pin 108.

Base section portion 12a, cover section 16, link 104 and housing section 14 form a four bar linkage with the pivot centers of hinge structure 72 and pivot pins 38 being fixed centers. Cover section 16 is the driver link, housing section 14 is the follower link, and link 104 is the coupler or connecting rod. In this manner, cover section 16 and housing section 14 are connected in driver/follower relation for coordinated simultaneous movement between their respective erected and folded positions.

To open camera 10, the operator holds base section 12 in one hand and with the other hand grasps the leading ends of cover side walls 106 and lifts cover section 16 upwardly. This causes cover section 16 to pivot in a counterclockwise direction (as viewed in FIGS. 4 and 5) towards its erected position. Link 104 is driven upwardly in response to the motion of cover section 16 and applies a force to housing section 14 at pivot pin 110, located to the left of pivot pin 38 in FIG. 5, producing a clockwise moment or torque on section 14 that causes it to pivot in a clockwise direction about pivot 38 towards its erect position.

The rotational torque applied to housing section 14 continues as cover section 16 moves towards its open position until link 104 and housing section 14 are in a dead center relationship wherein pivots 108, 110 and 38 are linearly aligned along a common line of action extending therethrough. As noted earlier, torsion spring 112 provides a force on link 104 that biases it in a counterclockwise direction about pin 108. When the four bar linkage is at the dead center position it is static but unstable. That is, a rotational force on cover 16 produced a reaction force that is transmitted along the common line of action so that it does not produce any rotational force on either link 104 or housing section 14. However, if either link 104 or housing section 14 is subjected to even a small independently applied rotational force, the pivot 110 will move off the common line of action and the four bar linkage will once again operate in the driver/follower relationship.

In the illustrated embodiment, spring 112 serves as the independent force to pivot link 104 to an over center position. This counterclockwise pivoting motion of link 104 about pivot 108 rotates housing section 14 in the clockwise direction until the lower end of housing forward wall 40 abuts against a rear edge 118 of a top wall section 120 of base section portion 12b that enclose a plurality of electrical switches (not shown) for controlling the sequence of operation of various electrical subsystem. Edge 118 serves as a stop against which housing section 14 abuts to define its upright erected position. Because further clockwise rotation of housing section 14 is inhibited by stop 118, and pivot 110 is offset or beyond a line of action running between pivots 108 and 38, the four bar linkage is stabilized, thereby maintaining housing sections 14 and 16 in their respective erected positions.

To close camera 10, the operator pushes rearwardly on link 104 so it rotates in a clockwise direction about pivot 108 to move pivot 110 through the dead center position to a position on the opposite side of the line of action between pivots 108 and 38. Now, camera 10 may be closed by pivoting cover section 16 downwardly in a clockwise direction about hinge 72 towards its closed position. Through the action of the four bar linkage, housing section 14 is thereby pivoted in a counterclockwise direction about pivot 38 to its folded storage position.

As noted earlier, the mirror assembly, now designated assembly 122, comprises the trapezoidal-shaped mirror 54 and the mirror support frame 55. Support frame 55, as best shown in FIG. 6, includes a flat transverse base plate 124 secured to the backside of mirror 54, near the trailing end thereof, by any suitable means (e.g., adhesive bonding) and the pair of laterally spaced upstanding and rearwardly extending mounting arms 56 thereon. The arms 56 are pivotally connected by pins 58 to a pair of forwardly extending mirror mount supports 126 provided on the interior side of a trailing end wall 128 of base section portion 12a.

The right support arm 56 also includes an integrally formed outwardly extending transverse boss 130 carrying a fixed pin 132 on the outboard end thereof for connecting mirror assembly 122 to the previously-noted linkage system 60 which interconnects assembly 122 with lens and shutter housing 14 for coordinated simultaneous movement between their respective erected and folded positions.

Linkage system 60 comprises an elongated rocker link 134 extending along the right side of base section portion 12a between the left side wall 34 and the facing side of the film receiving chamber 22, and a link driving cam track 136 integrally formed in the bottom portion of the left side wall 39 of the lens and shutter housing 14.

Link 134 pivots, intermediate its opposite ends, about an inwardly extending pin 138 secured to the interior of left side wall 34 for movement between the erected position of FIG. 4 and the folded storage position of FIGS. 5 and 6. Extending forwardly of pin 138 is a forward link section 140 that carries, at its leading end, a fixed transverse pin 142 which extends into and rides along the cam track 136 thereby coupling link 134 to housing section 14. Extending rearwardly from pin 138 is an intermediate link section 144 that is inclined upwardly at a relatively shallow angle with respect to the horizontal forward section 140 (as viewed in FIG. 4), and a trailing end section 146 that is inclined upwardly at a steeper angle than section 144 and includes an inwardly offset portion 148 to position a terminal end 150 thereof adjacent boss 130 so that pin 132 extends through an inclined cam slot 152 to couple the rocker link 134 to mirror assembly 122.

The link driving cam track 136 includes a relatively short inclined mirror pivot section 154 followed by a longer arcuate dwell section 156. All points along dwell section 156 are at a constant radial distance from the pivot pin 38 so that when link pin 142 is riding in this section of track 136 the pin is not displaced with respect to pivot pin 38 or the link pivot pin 138 and there is no pivotal motion imparted to rocker link 134. On the other hand, points along mirror pivot section 134 vary in radial distance from pivot pin 38. This variation increases linearly from the transition zone between sections 154 and 156 to the terminal end of section 154. As pin 142 rides in section 154 in response to rotation of housing section 14, it is displaced vertically with respect to link pivot pin 138 thereby producing pivotal motion in link 134 to rotatably drive the mirror assembly 122.

As best shown in FIG. 5, when camera 10 is in the closed position, pin 142 sits at the terminal end of cam track dwell section 156 with rocker link 134 in its folded position. as camera 10 is opened, housing section 14 pivots in a clockwise manner about pivot 38 in response to the opening motion of cover section 16. Because dwell section 156 is at a constant radial distance from pivot 38, there is no displacement force applied to pin 142 and link 134 and mirror assembly 122 remain in their respective folded positions until housing section 14 is relatively close to its erected position. This allows housing section 14 to clear out of the path of travel of the mirror 54 before the mirror is erected.

In response to further clockwise rotation of housing section 14, pin 142 passes into cam track section 154 and is driven downwardly as it follows the downwardly inclined slope of this portion of the guide channel 136. As a result of this downward pressure on pin 142, link 134 pivots in a clockwise direction about pin 138 thereby lifting the trailing end of link 134 upwardly to apply an upward force on pin 132. This provides a counterclockwise moment on the mirror support frame 55 and it pivots about pin 58 to raise the mirror 54 to the erected position of FIG. 4. With housing section 14 maintained in its upright erected position wherein it is urged into abutment with edge 118 by the over center erecting link 104, the position of pin 142 is fixed in cam track portion 154 thereby fixing the position of link 134. In turn, this fixes the position of mirror 54 in that pin 132 is held at fixed position with the inclined slot 152.

As camera 10 is closed, the sequence of movement of the components is reversed. In response to initial rotation of housing section 14 from its erected position toward its folded position, pin 142 rides in the short track section 154 and is displaced upwardly. This pivots link 134 in a counterclockwise direction about pin 138 to drive mirror assembly 122 downwardly to its folded position. Thereafter, pin 142 enters the dwell section 156 and housing section 14 pivots downwardly without cam track 136 effecting any further displacement of the rocker link 134.

With this linkage system, the movement of mirror 54 and housing section 14 which have intersecting arcs of travel, are coordinated so that they do not interfere with each other while allowing them to be stacked in the interleafed arrangement to make camera 10 more compact in its longitudinal dimension. That is, as the camera is opened, housing section 14 is moved through a major portion of its arc of travel toward the erected position before rotational movement is imparted to mirror 54 to clear housing section 14 out of the mirror's arc of travel. Upon closing the camera, the mirror 54 is moved through a major portion of its arc of travel during only slight rotational movement of housing section 14 away from its erected position to clear the mirror out of the path of travel of housing section 14. Movement of mirror 54 in this manner also clears it out of the folding path of the bellows 18.

There are two distinct functional aspects to bellows 18. The first relates to the photographic process wherein the erected bellows 18 cooperates with the lens and shutter housing 14 and the base section portion 12a to define the ambient light excluding exposure chamber 66 surrounding the exposure optical path between lens 42, mirror surface 62 and the film plane 26. The second relates to its design and structure for automatic movement between its erected and folded positions and, perhaps more importantly, to its integration into the camera folding scheme so that it may be folded into the flat storage configuration without conflict with the other movable camera components.

Bellows 18 preferably is formed of any suitable thin light opaque flexible sheet material such as rubber, vinyl or the like. As best shown in FIGS. 4 and 7, the erected bellows 18 includes a generally rectangular base or bottom peripheral section 158, a forward wall 160, the opposed rear wall 68, a pair of side walls 162 and an accordance pleated top wall 164.

The base section 158 comprises an accordion pleated leading end wall 166, a pair of oppositely spaced planar side walls 168, and a pleated trailing end wall 170. The vertical planar forward wall 160 is set back from the leading end wall 166 behind a short horizontal transverse wall 172 covering the top of the projecting leading end of base section 158.

The base section 158 is secured to the inner frame within portion 12a surrounding the film pack receiving chamber 22; the front wall 160 is secured to the rear wall 64 of housing section 14 and the short horizontal wall 172 is secured to a transverse horizontal bottom flange section 174 of housing section 14 intermediate side walls 39. A central recess or cutout (not shown) is provided in flange 174 and the front end of base section 158 to provide clearance for the motor 35 when camera 10 is folded. A central opening 176 is provided in bellows front wall 160, in registration with lens 42, through which image forming light rays are transmitted into the exposure chamber 66.

The side walls 162 incline inwardly as they extend upwardly from peripheral side walls 168 to the top wall 164. Thus, the upper end of the left bellow side walls 162 is inboard of the sight line between the viewfinder forward lens 44 and its rear lens 46 and does not interfere with the viewfinder optical path when the bellows is erected. Forward and rear pleats, as suggested in FIG. 7 at 178 and 180, are provided in side walls 162 to facilitate folding.

The erected bellows rear walls 68 extends upwardly from trailing end wall 170 to top wall 164 and is inclined at approximately 45° with respect to base section 158 to overlie the erected mirror 54.

In a preferred embodiment, a lower section 182 of rear wall 68, below a dotted hinge line H shown in FIG. 7, is adapted to be attached to the facing backside of mirror 54 while an upper section 184 of wall 68, above hinge line H, is not attached to the upper portion of mirror 54 to facilitate folding bellows 18, as will become apparent later.

In the illustrated embodiment, a pair of openings 186 are provided in the rear lateral corners of lower wall section 182 through which the mirror pivot arms 56 extend. The lower section 182 is securely attached to the lower back side of the mirror assembly 122 by means of four (4) L-shaped compression clips 190, three of which are attached to the back side of mirror 54 and one to mirror support frame base plate 124, that extend through a large opening 192 in lower section 182 and engage the edge portions of section 182 surrounding opening 192. Clips 190 urge the bellows material into intimate contact with the back side of the mirror assembly to provide a light tight seal therebetween. In an alternative embodiment, the clips 190 and opening 192 may be eliminated and section 182 may be attached to the lower portion of the mirror assembly by adhesive bonding.

Above the hinge line H, upper section 184 is preferably stiffened to facilitate its pivotal motion about hinge line H when the bellows 18 is moved between its erected and folded positions. In the illustrated embodiment, this is accomplished by providing a stiffening panel 194 on the interior side of section 184. Panel 194 may be formed of cardboard or a stiff plastic material and is secured to the interior surface of section 84 by any suitable method such as adhesive bonding.

As best shown in FIG. 4, when bellows 18 is erected the unattached stiffened section 184 of rear wall 68 overlies the upper free end of mirror 54 with the accordion pleated top wall 164 bridging the gap between the top of the mirror and the rear wall 64 of housing section 14. The pleats are provided in top wall 164 and the end walls 166 and 170 to allow those sections to stretch and contract as the bellows is manipulated to facilitate the folding action and also to accommodate the pivotal movement of components adjacent thereto.

As noted earlier, when the camera is folded, initial counterclockwise rotation of housing section 14 actuates the linkage system 60 causing mirror assembly 122 to pivot down rapidly in a clockwise direction about pivot pins 58 to the folded position of FIG. 5. In response to this motion, the rear portion of the side walls 162 fold along pleats 180 and the attached section 182 of rear wall 68, below hinge line H, is driven downwardly by the mirror assembly through its connection thereto via clips 190. However, the unattached stiffened upper section 184, having its leading end in effect attached to the upper end of housing section 14 by the connecting top wall 164 does not follow the upper end of mirror 54 but rather is constrained by the top walls 164 which is now elongated to accommodate the increased distance between the hinge line H and the point of attachment of top wall 164 to the upper end of housing section 14. Due to the movement of mirror assembly 122 to its folded position, the upper section 184 of bellows 18 in effect is pivoted in a counterclockwise direction about the hinge line H, away from the upper back side of mirror 54 so that it lies in a plane, along with the extended top wall 164, extending between hinge line H and the upper end of the rear wall 64 of housing section 14.

Now, as housing section 14 continues to pivot downwardly towards its closed position, the forward ends of bellows side walls 162 fold along the pleats 178, and the stiffened section 184 and the top wall 164 continue to pivot in a counterclockwise direction about the hinge line H. During this rotation, the stiffened section 184 passes through the over center position (i.e., where it is perpendicular to the plane of mirror 54) and continues downwardly until it is folded back over the lower section 182 in substantially parallel overlying relation thereto with the top wall 164 overlying it in a common plane with bellows front wall 160. Thus, the lower section 182, the stiffened section 184 and the extended top wall 164 assume a Z-fold configuration for flat storage with portions thereof disposed between housing section 14 and mirror 54, overlying the film plane 26.

The pleated rear wall 170 compresses to accommodate the rotational movement of the mirror support frame 55 and the leading end peripheral wall 166 elongates to accommodate the upward displacement of the bottom portion of housing section 14 when it pivots to its folded position.

Upon erecting camera 10, initial clockwise rotation of housing section 14 lifts the top wall 164. This upward motion of top wall 164 causes it to pivot the folded section 184 in a clockwise manner about the hinge line H so that is passes over center and once again is aligned with top wall 164. Now, in response to the action of linkage system 60, the mirror assembly 122 is pivoted upwardly in a counterclockwise direction about pins 58 to erect mirror 54 and the lower section 182 of bellows rear wall 68. This releases the tension in top wall 164 and it contracts to bring the upper stiffened section 184 once again into overlying relation with the upper end of the erected mirror 54.

If one visualizes the individual and collective folding paths of travel of rear wall sections 182 and 184 and top wall 164, it becomes apparent that at least sections 182 and 184 must move through the plane formerly occupied by the erected mirror 54. In order for these bellows sections to assume the flat Z-folded configuration of FIG. 5, mirror 54 must be moved out of the collective folding path ahead of the folding action. Thus, in addition to coordinating the movement of the mirror assembly 122 with housing section 14, the linkage system 60 also coordinates the movement of assembly 122 with the folding action of bellows 18 by moving assembly 122 downwardly towards the film plane 26 ahead of bellows sections 182 and 184 to provide the necessary clearance for the bellows folding motion. Conversely, as the camera is opened, erection of the mirror 54 is delayed so that the bellows sections may move through the erected mirror position as they unfold before mirror 54 is moved into its erected exposure position.

By means of the above-described coordinated movement of the bellows 18, mirror assembly 122 and the lens and shutter housing 14, these components assume a compact folded configuration arranged in stacked relation over the film plane area 26 where the photosensitive image forming area of the forwardmost film unit 25 is to be located in position for exposure. Once arranged in this stacked relation, these components are covered and protected by the closed cover section 16 as best shown in FIG. 3.

As noted earlier, the rear viewfinder lens assembly 20 is configured to be automatically erected and folded in response to respectively opening and closing camera 10.

The elongated cover 82 is pivotally connected to cover section 16 at pivot pins 84 and torsion spring 98 provides a clockwise (as viewed in FIGS. 4 and 5) or opening biasing force on cover 82 for continuously urging it toward the erected position.

When cover section 16 is in its erected position, the clockwise biasing force on cover 82 and the camming action of guide tracks 94 maintain the pins 92 at the left terminal ends of the guide tracks 94 to hold frame 88 in its upright erected position, substantially perpendicular to cover 82, wherein rear lens 46 is in optical alignment with the front lens 44 of the viewfinder.

As cover section 16 is closed manually, after releasing erecting link 104, frame 88 and cover 82 initially maintain their perpendicular relationship and rotate downwardly together with frame 88 pivoting in a clockwise direction about hinge 90 and cover 82 following its point of attachment to cover section 16 at pins 84. The downward motion of cover section 16 causes link 104 to rotate housing section 14 downwardly toward its folded position and the upper end of its forward wall 40 moves into a position beneath the decending finger 86 of cover 82 projecting forwardly into cover section 16. When the lens and shutter housing section 14 reaches its folded position of FIG. 5, the cover section 16 is still raised a bit relative to housing section 12 and the tip of finger 86 is in engagement with forward wall 40. Cover section 82 is in effect a lever having its fulcrum at pins 84 with its right-hand end (tip of finger 86) prevented from moving further downwardly by its engagement with the forward wall 40 of housing section 14. Thus, in response to the operator pushing downwardly on cover section 16 to move it to its folded position, the fulcrum 84 is driven downwardly causing cover 82 to pivot in a counterclockwise direction about pivot pins 84 to its folded position within apertures 80. In response to this downward movement, the pins 92 on frame 88 slide forwardly in the arcuate guide tracks 94 as a result of the camming action of tracks 94 on pins 92 thereby causing the frame 88 to pivot downwardly to its horizontal folded position between the side walls 96 of cover 82. The finger 86 remains in engagement with the forward wall 40 of housing section 14 thereby counteracting the influence of spring 98 to maintain cover 82 in the folded position wherein it is substantially flush with the portions of cover section 16 around aperture 80.

When camera 10 is open, the upward motion of cover section 16 results in the finger 86 becoming disengaged from the forward wall 40 of housing section 14 whereupon the biasing force of spring 98 rotates cover 82 in a clockwise direction about pins 84. This motion of cover 82 relative to cover section 16 causes the pins 92 to be cammed to the left terminal ends of tracks 94 to pivot the lens holding frame 88 into perpendicular relationship with cover 82. When cover section 16 reaches its erected position, it locates the lens frame 88 and cover 82 in the operative erected position of FIG. 4.

Since certain changes may be made in the abovedescribed folding bellows without departing from the scope of the invention herein involved, it is intended that all matter contained in the above description or shown in the accompanying drawings shall be interpreted as illustrative and not in a limiting sense.

What is claimed is:

1. A folding bellows for light shielding the exposure optical path in a folding camera of the type including a base housing section having a film plane therein, a lens housing section mounting an objective lens and being pivotally coupled to the base section, adjacent one end of the film plane, for movement between an upstanding operative erected position and a storage position folded back over the base section so as to overlie at least a portion of the film plane, and a mirror assembly including a mirror pivotally coupled to the base section, adjacent an opposite end of the film plane, for coordinated movement with the lens housing section between an erected position for reflecting image forming light rays transmitted by the lens onto the film plane to expose a film unit thereat and a folded storage position overlying at least a portion of the film plane with at least a portion of the mirror located between the film plane and the lens housing section located in its folded position, said bellows being formed of a thin, flexible, light opaque material and comprising:
    a bottom section attached to the base housing section in surrounding relation to the film plane;
    a forward wall joined to a leading end of said bottom section and being attached to a rear wall of the lens housing section, said forward wall having an opening therein aligned with said lens through which image forming light rays are transmitted into the interior of said bellows;
    a rear wall joined to a trailing end of said bottom section and configured to overlie a back side of the mirror when said bellows and mirror are erected, said rear wall including lower section thereof that is attached to a facing portion of the mirror, and an upper section thereof that is not attached to that portion of the mirror facing said upper section;
    a pair of oppositely spaced side walls, each of said side walls extending between a corresponding side portion of said bottom section and adjacent ends of said forward and rear walls;
    an extensible top wall joining adjacent upper ends of said forward, rear and side walls, said top wall being movable between retracted and extended positions;
    said bellows being movable in response to corresponding movement of the lens housing section and mirror assembly between an erected position, wherein said upper and lower sections of said rear wall are in substantially coplanar relation overlying the back side of the erected mirror, said top wall is in its said retracted position and said bellows forms at least a portion of an ambient light excluding exposure chamber surrounding the exposure optical path extending between the lens, mirror and film plane, and a substantially flat folded storage position overlying at least a portion of the film plane wherein said upper section of said rear wall is folded back over its lower section and said top wall is in its said extended position.

2. The bellows of claim 1 wherein said rear wall upper and lower sections and said extended top wall assume a Z-folded configuration located between said mirror and lens housing section when said bellows, mirror assembly and lens housing section are in their respective folded positions.

3. The bellows of claim 1 wherein said upper section of said rear wall is relatively stiff compared to other flexible portions of said bellows and is configured to pivot back over said lower section in response to the lower section being moved to its storage position by the mirror.

4. The bellows of claim 3 wherein said top wall is extended as the bellows is moved toward its said storage position to accommodate the pivoting motion of said upper rear wall section.

5. The bellows of claims 3 or 4 wherein said extended top wall lies in substantially the same plane as said forward wall when said bellows is in its said folded storage position.

6. The bellows of claim 5 wherein said top wall is pleated.

7. The bellows of claim 1 wherein portions of said bottom section are extensible and retractable to accommodate movement of the mirror assembly and lens housing section between their respective erected and storage positions.

* * * * *